United States Patent
Frenkel et al.

(10) Patent No.: US 8,151,338 B2
(45) Date of Patent: Apr. 3, 2012

(54) METHOD AND SYSTEM FOR CONTINUOUSLY SERVING AUTHENTICATION REQUESTS

(75) Inventors: Ilan Frenkel, Tel-Aviv (IL); Arthur Zavalkovsky, Netanya (IL); Alexey Kobozev, Rishon-LeZion (IL); Ilan Bronshtein, Rishon-LeZion (IL)

(73) Assignee: Cisco Technology, Inc., San Jose, CA (US)

( * ) Notice: Subject to any disclaimer, the term of this patent is extended or adjusted under 35 U.S.C. 154(b) by 1454 days.

(21) Appl. No.: 11/239,010

(22) Filed: Sep. 29, 2005

(65) Prior Publication Data

US 2007/0074049 A1    Mar. 29, 2007

(51) Int. Cl.
*H04L 29/06* (2006.01)

(52) U.S. Cl. .......................... 726/12; 713/153

(58) Field of Classification Search .................. 713/193
See application file for complete search history.

(56) References Cited

U.S. PATENT DOCUMENTS

| | | | | |
|---|---|---|---|---|
| 6,282,575 | B1* | 8/2001 | Lin et al. | 709/244 |
| 7,127,490 | B1* | 10/2006 | Walden et al. | 709/206 |
| 2001/0032262 | A1* | 10/2001 | Sundqvist et al. | 709/226 |
| 2005/0055552 | A1* | 3/2005 | Shigeeda | 713/171 |
| 2005/0177730 | A1 | 8/2005 | Davenport et al. | |
| 2005/0177750 | A1 | 8/2005 | Gasparini et al. | |

* cited by examiner

*Primary Examiner* — Gilberto Barron, Jr.
*Assistant Examiner* — Simon Kanaan
(74) *Attorney, Agent, or Firm* — Fish & Richardson P.C.

(57) ABSTRACT

A method and system for continuously serving the authentication requests of networked computers is disclosed. The authentication requests of computers are served and the services for the computers are reserved for a predefined time interval. The authentication service for a computer is reserved by an authentication server, which receives authentication requests of the computer.

15 Claims, 8 Drawing Sheets

METHOD AND SYSTEM FOR CONTINUOUSLY SERVING AUTHENTICATION REQUESTS

BACKGROUND OF THE INVENTION

1. Field of Invention

Embodiments of the invention relate in general to AAA servers. More specifically, embodiments of the invention relate to methods and systems for continuous authentication services provided by the AAA servers.

2. Description of the Background Art

Network computers often access resources from their own networks and from other networks. Point-to-Point Protocol (PPP) can be used to connect the networked computers to other networks. An extension to the PPP, which is known as Extensible Authentication Protocol (EAP), provides authentication service to those computers, which require access to the network resources. EAP supports multiple authentication methods, such as token cards, Kerberos, one-time passwords, certificates, public key authentication and smart cards. Moreover, EAP provides layer-2 authentication functionality to network computers. In layer-2 authentication, the networked computers have to pass through a process of authentication before connecting to other networks. The mechanism of authentication prevents unauthorized networked computers from gaining access to confidential information, and also reduces a possibility of network threats. These network threats can be in the form of worms and viruses. 802.1x is an IEEE (Institute of Electrical & Electronic Engineers) standard, which provides authentication and resource access control capability to the networked computers for accessing resources or data from protected networks.

AAA servers are used for authentication, authorization, and accounting services in networks. An AAA server authenticates a computer, based on its unique identity information. This unique identity information can be in the form of a user name and a password. The AAA server grants or denies the information and services of the network to a computer, depending on the authentication, authorization, and accounting rule defined for the computer.

A typical AAA server can authenticate hundreds of computers per second. The problem arises in a situation wherein all the computers are disconnected from the network as a result of temporary loss in network connectivity. In such cases, the computers can try to regain authentication as soon as network connection is re-established. The AAA server may stop responding as a result of the bulk of requests. This situation is commonly known as a friendly DOS attack.

According to the conventional method, static AAA servers are used to enhance the quality of authentication service to network computers that are its clients. However, the quality of authentication service can be hampered since the static servers may stop responding as a result of DOS attacks.

DETAILED DESCRIPTION OF EMBODIMENTS OF THE INVENTION

Various embodiments of the invention provide a method and a system for continuous authentication service to clients of authentication servers in a network. Each client in the network can attempt access to one or more network resources. This attempt to access can be accompanied by a request for authentication from the client. According to various embodiments of the invention, the authentication server that responds to the request, reserves its service for serving the authentication requests of the client. The service is reserved and authentication requests are answered continuously for a predefined time interval. Similarly, the authentication server can reserve its service for a number of clients.

Figure 1:
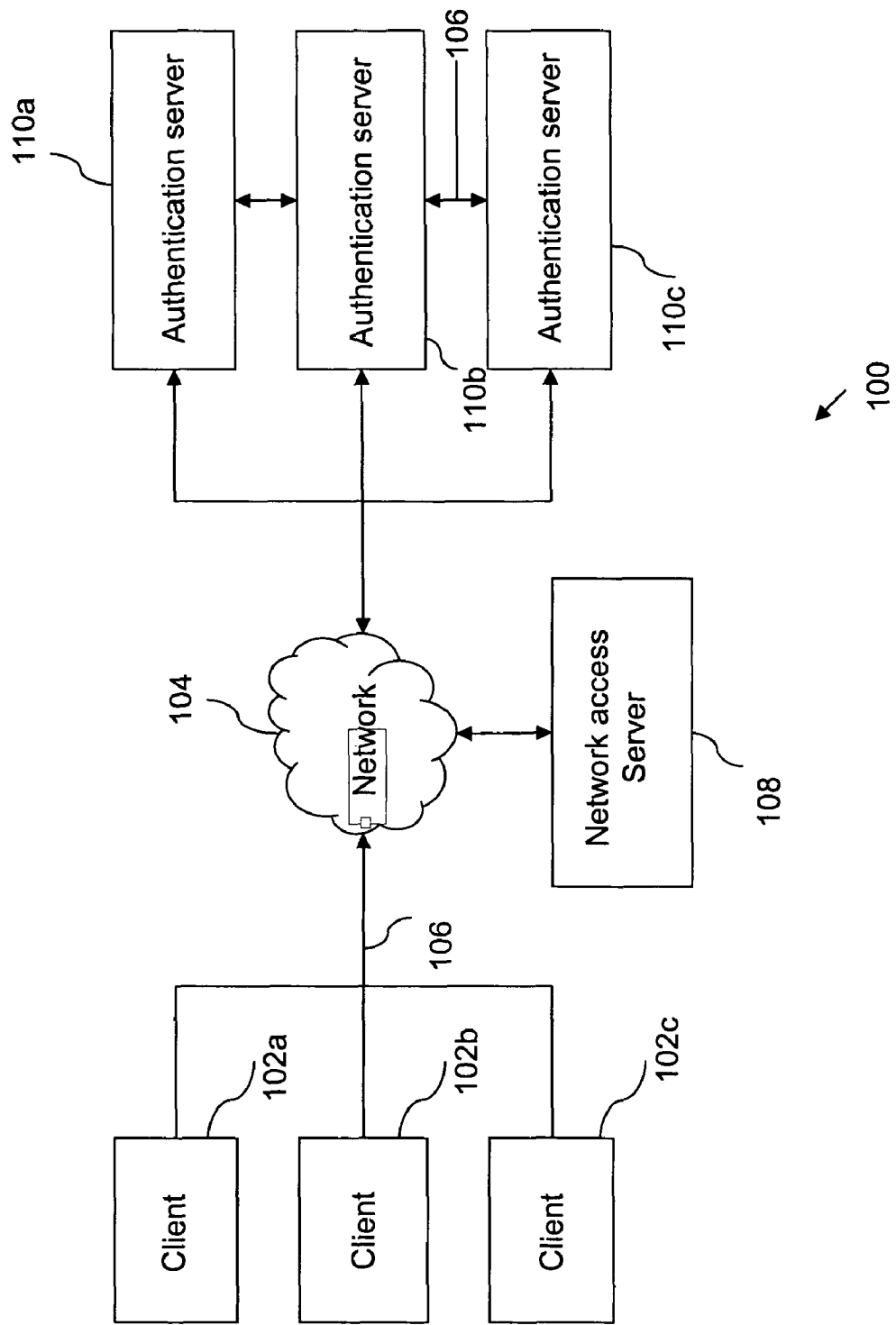
FIG. 1 shows a network environment wherein the invention can be implemented for providing continuous service to authentication requests, in accordance with various embodiments of the invention.

FIG. 1 shows a network environment wherein the invention can be implemented to provide continuous service to authentication requests, in accordance with various embodiments of the invention. Network environment 100 includes clients 102, a network 104, a network access server 108, and authentication servers 110. Clients 102 can include a client 102a, a client 102b, and a client 102c. In an embodiment of the invention, clients 102 require resources or data access from network 104. Examples of network 104 include Local Area network (LAN), Metropolitan Area Network (MAN), Wide Area Network (WAN), Virtual Private Network (VPN), and the like. Examples of each of clients 102 include personal computers, laptops, workstations, mobile communication devices, telephony instruments, and the like. Clients 102 undergo a process of authentication to access resources from network 104. The process of authentication can be implemented with the help of application software. The application software can be located at each of clients 102, to initiate authentication requests from them in order to gain access to network resources. Examples of application software may include the 'Cisco IOS Software'.

In an embodiment of the invention, network access server 108 receives authentication requests from clients 102. These authentication requests can be in the form of frames, which follow the 802.1x authentication protocol. Network access server 108 can receive these authentication requests in an encrypted format. Examples of network access server 108 include a router, a switch, a wireless access point, and the like. Network access server 108 can forward authentication requests of clients 102 to authentication servers 110. Authentication servers 110 can include an authentication server 110a, an authentication server 110b, and an authentication server 110c. Authentication servers 110 can include a database each, which stores the authentication information of clients 102. Authentication servers 110 compare the authentication information of the clients that send authentication requests with the authentication information stored in their databases. The result of the comparison determines the ability of a requesting client to access a required network resource.

Examples of authentication servers 110 include servers that support Remote Authentication Dial In User Service (RADIUS) protocol, Terminal Access Controller Access Control System Plus (TACACS+) protocol, and the like. Authentication servers 110 return a network access policy to network access server 108. This network access policy is for each of clients 102. Network access server 108 applies the network access policy onto clients 102 and allows network access to clients 102, based on their network access policy.

Figure 2:
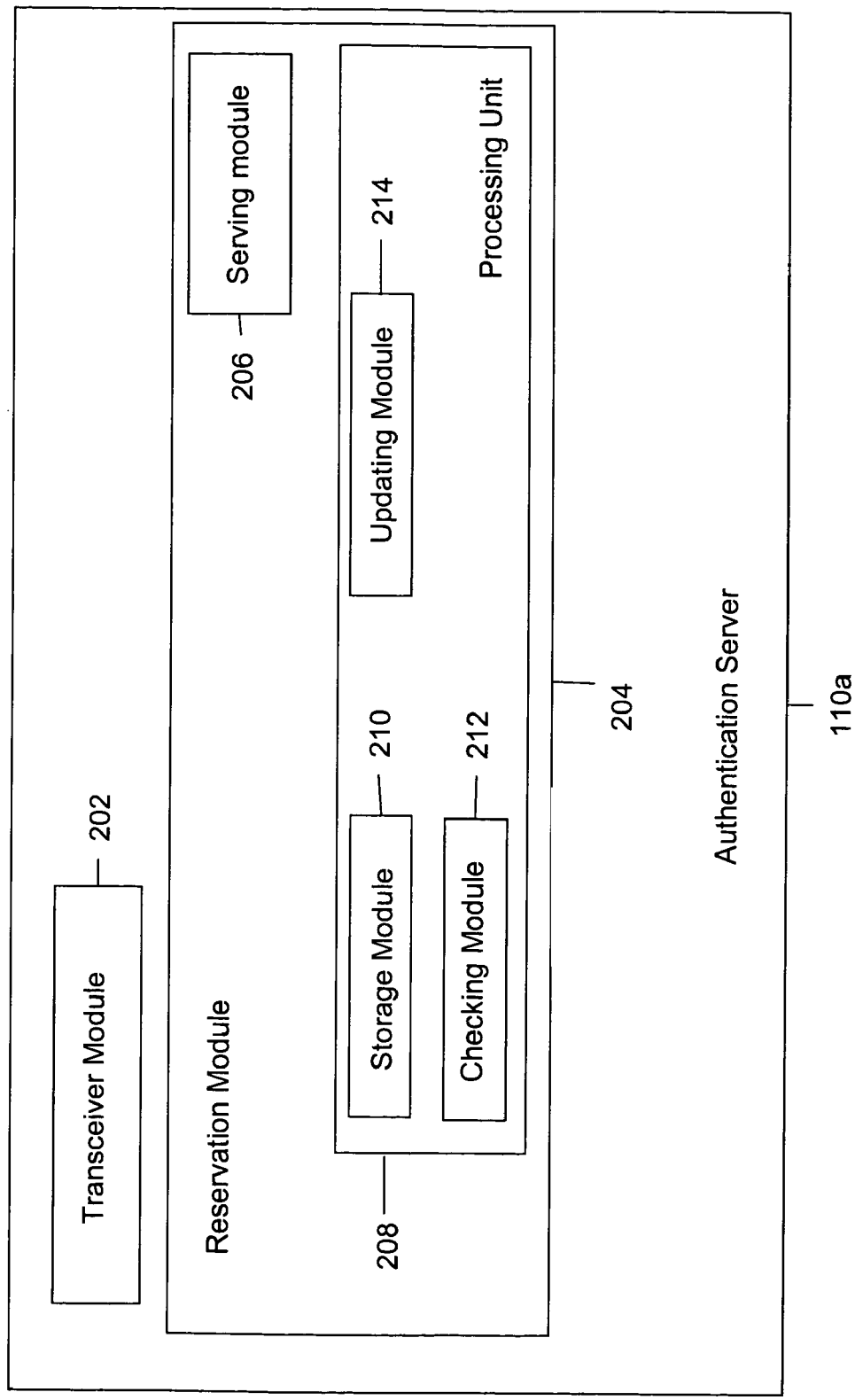
FIG. 2 is a block diagram illustrating an authentication server, in accordance with an exemplary embodiment of the invention.

FIG. 2 is a block diagram illustrating authentication server 110*a*, in accordance with an exemplary embodiment of the invention. Authentication servers 110*a*, 110*b*, and 110*c* as shown in FIG. 1, are similar to each other. Authentication server 110*a* can include a transceiver module 202 and a reservation module 204. Transceiver module 202 can receive authentication requests forwarded through network access server 108. In addition, transceiver module 202 can also transmit the authentication requests to reservation module 204. Transceiver module 202 can also transmit two lists, one list to network access server 108 and the other to authentication servers 110. According to an embodiment of the invention, the list to network access server 108 can include identification details and number of reserved clients of each of authentication servers 110. The list sent to authentication servers 110 can include the number of network access servers. Reservation module 204 reserves authentication services for the clients for which authentication server 110*a* provides authentication services. Reservation module 202 can include a serving module 206 for serving authentication requests and a processing unit 208, to reserve the authentication service. According to an embodiment of the invention, serving module 206 receives authentication requests from transceiver module 202 and serves the received authentication requests. These requests are served only after verification of the requesting client. The verification can involve comparison of the authentication information related to the requesting client with the authentication information corresponding to the requesting client that is stored in the database of authentication server 110*a*.

According to various embodiments of the invention, processing unit 208 includes a storage module 210, a checking module 212, and an updating module 214. Storage module 210 can store the authentication information corresponding to clients 102 that are served by serving module 206. In an embodiment of the invention, storage module 210 can be a secondary memory device such as magnetic disk, magnetic tape, and equivalents thereof. Examples of magnetic disk include hard drives, floppy disks, optical disks, and equivalents thereof. Each of clients 102, for which the corresponding identification details are stored in storage module 210 becomes a 'reserved' client of the authentication server that serves them. For example, if the authentication request for client 102*a* is served by authentication server 110*a*, then client 102*a* is a reserved client of authentication server 110*a*. In an embodiment of the invention, checking module 212 checks the transactions taking place at storage module 210 and determines if there are any additions or removals in the reserved clients from storage module 210. Checking module 212 can also check the number of authentication servers 110 and collect information relating to the number of reserved clients at each of authentication servers 110. Updating module 214 can update the stored list with the identification details of the reserved clients as determined by checking module 212. The identification details can include specific identity given to each client that remains unique in network environment 100. Updating module 214 can transmit the recently stored list to transceiver module 202. In an embodiment of the invention, checking module 212 also checks and determines the number of network access servers present in network environment 100. Updating module 214 can update the second of the two lists with the number of network access servers as determined by checking module 212. Updating module 214 can also transmit the second list to transceiver module 202.

Figure 3:
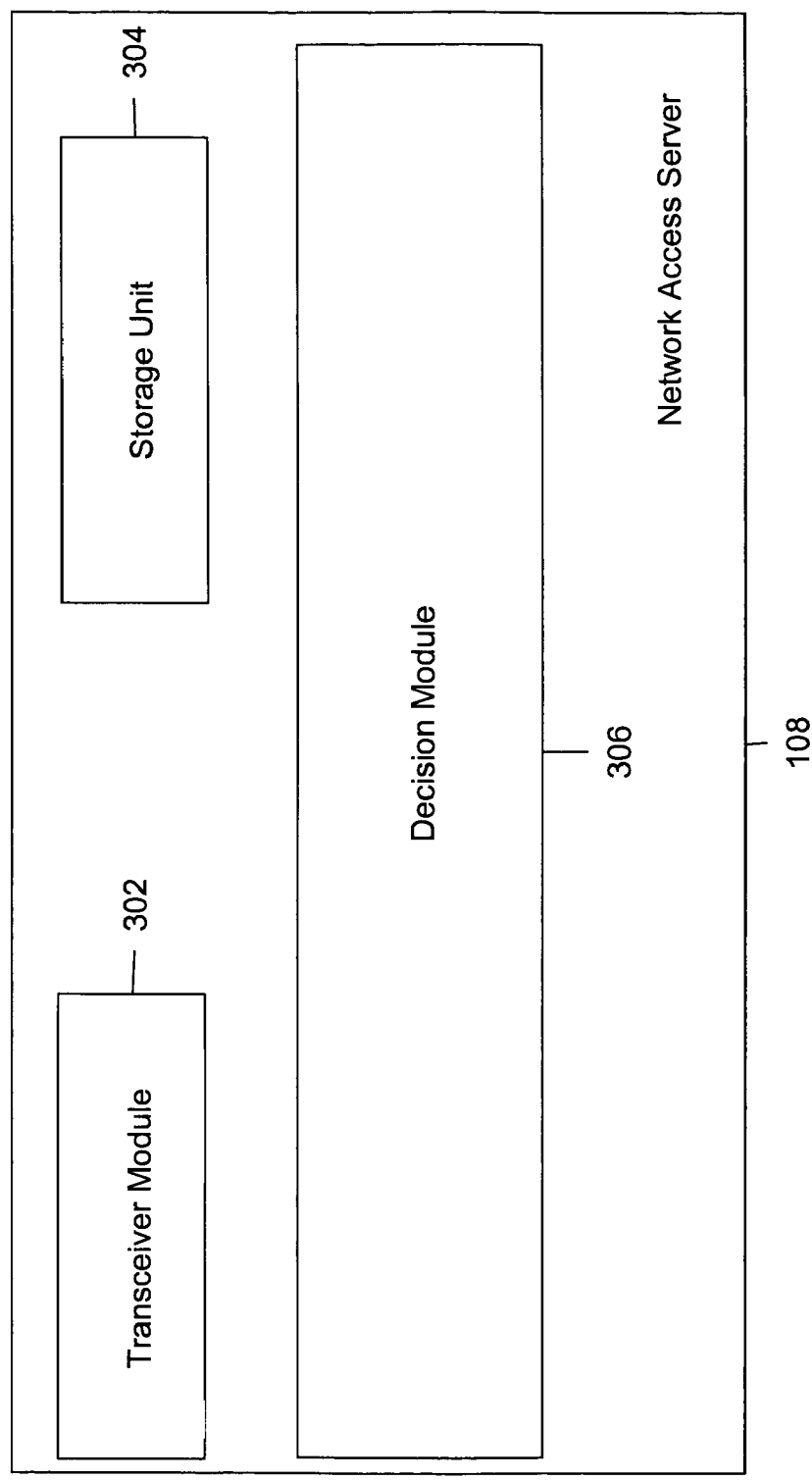
FIG. 3 is a block diagram illustrating a network access server, in accordance with an exemplary embodiment of the invention.

FIG. 3 is a block diagram illustrating network access server 108, in accordance with an exemplary embodiment of the invention. Network access server 108 can include a transceiver module 302, a storage unit 304, and a decision module 306. Transceiver module 302 can receive authentication requests from clients 102. Transceiver module 302 can also transmit authentication requests to authentication servers 110. Transceiver module 302 can also receive one or more lists from authentication servers 110. Storage unit 304 can store the lists, which are received by transceiver module 302. Decision module 306 can check the lists, which are stored in storage unit 304 and determine one of authentication servers 110 with the least number of reserved clients. Decision module 306 can also forward the identification details of the determined authentication server to transceiver module 302. For example, if authentication server 110*b* is serving the least number of reserved clients, decision module 306 forwards the identification details of authentication server 110*b* to transceiver module 302. Transceiver module 302 can now transmit authentication requests for the remaining clients 102 to authentication server 110*b* till the time for which authentication server 110*b* cannot reserve its services for any more clients.

Figure 4:
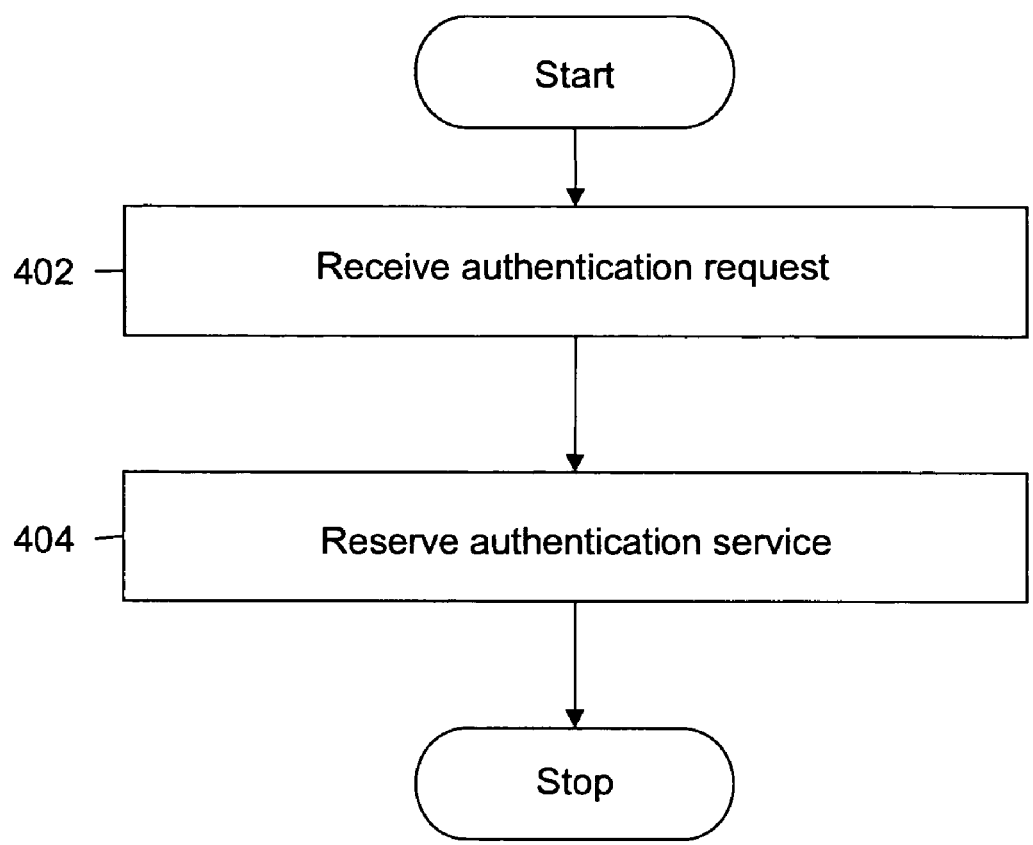
FIG. 4 is a flowchart illustrating a method for providing continuous service to authentication requests for clients in the network, in accordance with an exemplary embodiment of the invention.

FIG. 4 is a flowchart illustrating a method for providing continuous service to authentication requests for clients 102 in network environment 100, in accordance with an exemplary embodiment of the invention. At step 402, an authentication server of authentication servers 110 receives an authentication request from a client, through network access server 108. At step 404, the authentication server reserves its service for the received authentication request and continuously serves the authentication requests for the client.

Figure 5:
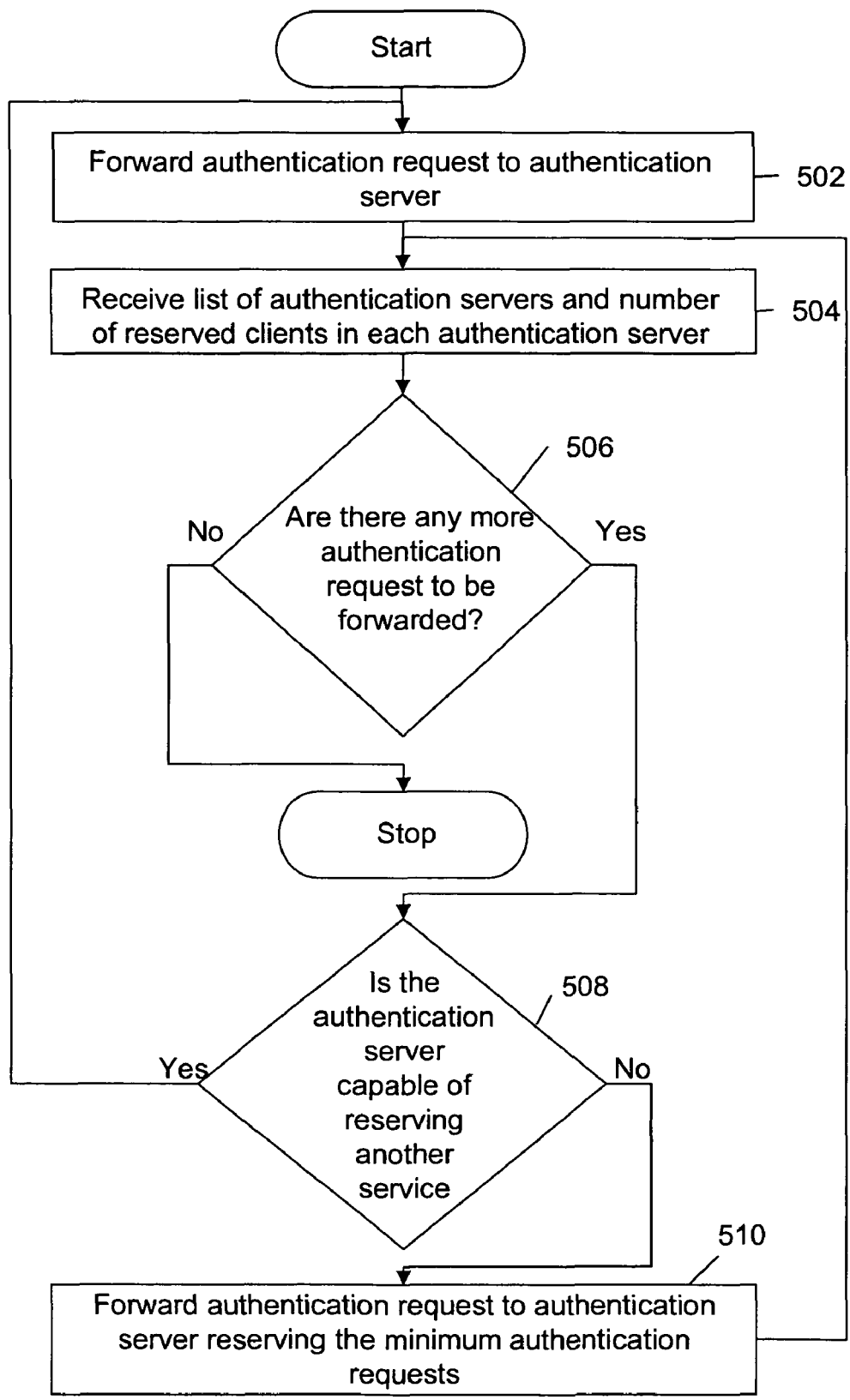
FIG. 5 is a flowchart illustrating a method for providing continuous service to authentication requests for clients, in accordance with another exemplary embodiment of the invention.

FIG. 5 is a flowchart illustrating a method for providing continuous service to authentication requests, in accordance with an exemplary embodiment of the invention. At step 502, network access server 108 forwards the authentication request of a client to one of authentication servers 110. The client can be one of clients 102. For example, network access server 108 forwards the authentication request to authentication server 110*a* and the forwarded authentication request is for client 102*a*. At step 504, authentication server 110*a* serves the authentication request of client 102*a* and reserves the authentication service for client 102*a*. The reservation of authentication service is for the predefined time interval. Authentication server 110*a* forwards one or more lists to network access server 108 after each step of serving the authentication request for client 102*a*. Network access server 108 receives the lists from authentication server 110*a* and stores the lists in storage unit 304.

At step 506, network access server 108 checks if it has received more authentication requests to be forwarded for clients 102. If network access server 108 receives more authentication requests, step 508 is performed. At step 508, network access server 108 checks if the one of authentication servers 110 which received the previous authentication request is capable of reserving service for another authentication request. If the one of authentication servers 110 is capable of reserving service for another authentication request, step 502 is performed.

If the one of authentication servers 110 is not capable of reserving service for another authentication request, step 510 is performed. At step 510, network access server 108 forwards the received authentication requests to one of authentication servers 110, based on the list, which is received from authentication server 110a. For example, network access server 108 forwards the authentication request to authentication server 110b, if authentication server 110b is reserving the minimum authentication requests, and the forwarded authentication request is for client 102b. This is followed by step 504. At step 504, authentication server 110b serves the authentication request of client 102b and reserves the service for client 102b, thereby ensuring continuous service to the authentication requests for clients 102 in network environment 100 by identifying one of authentication servers 110.

Figure 6A:
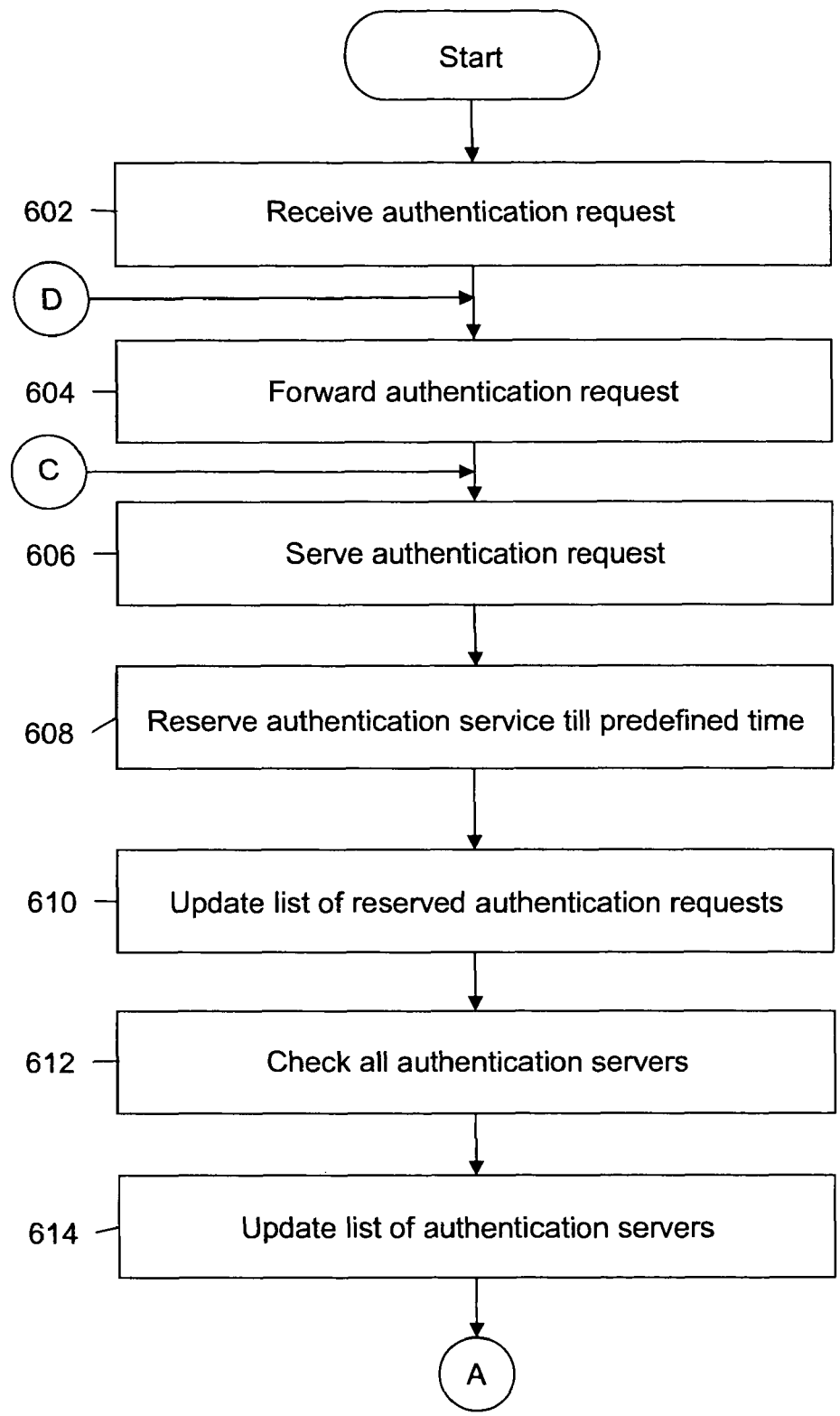
FIGS. 6a, 6b and 6c is a detailed flowchart illustrating a method for providing continuous service to authentication requests, in accordance with another exemplary embodiment of the invention.
Figure 6B:
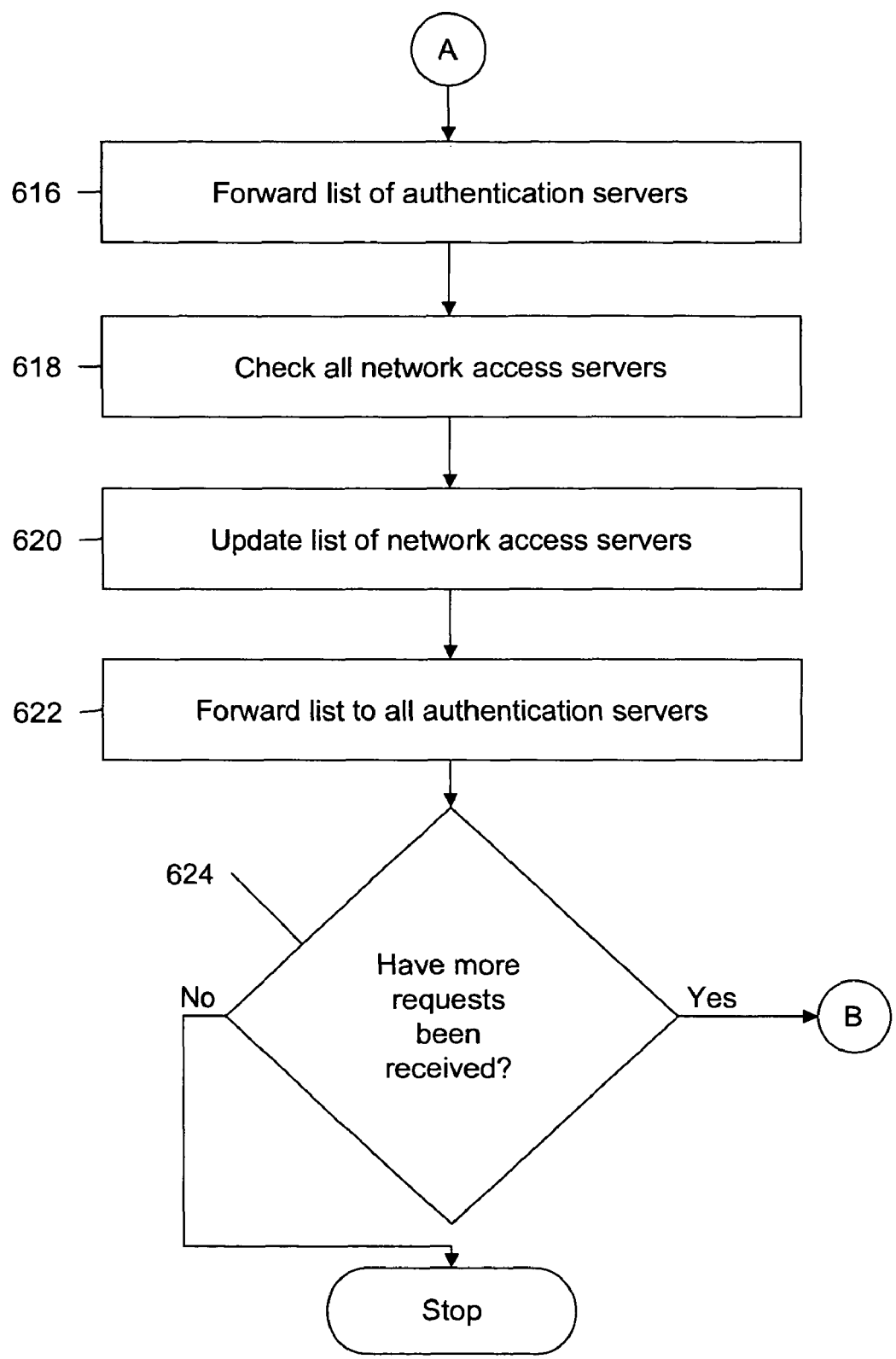
Figure 6C:
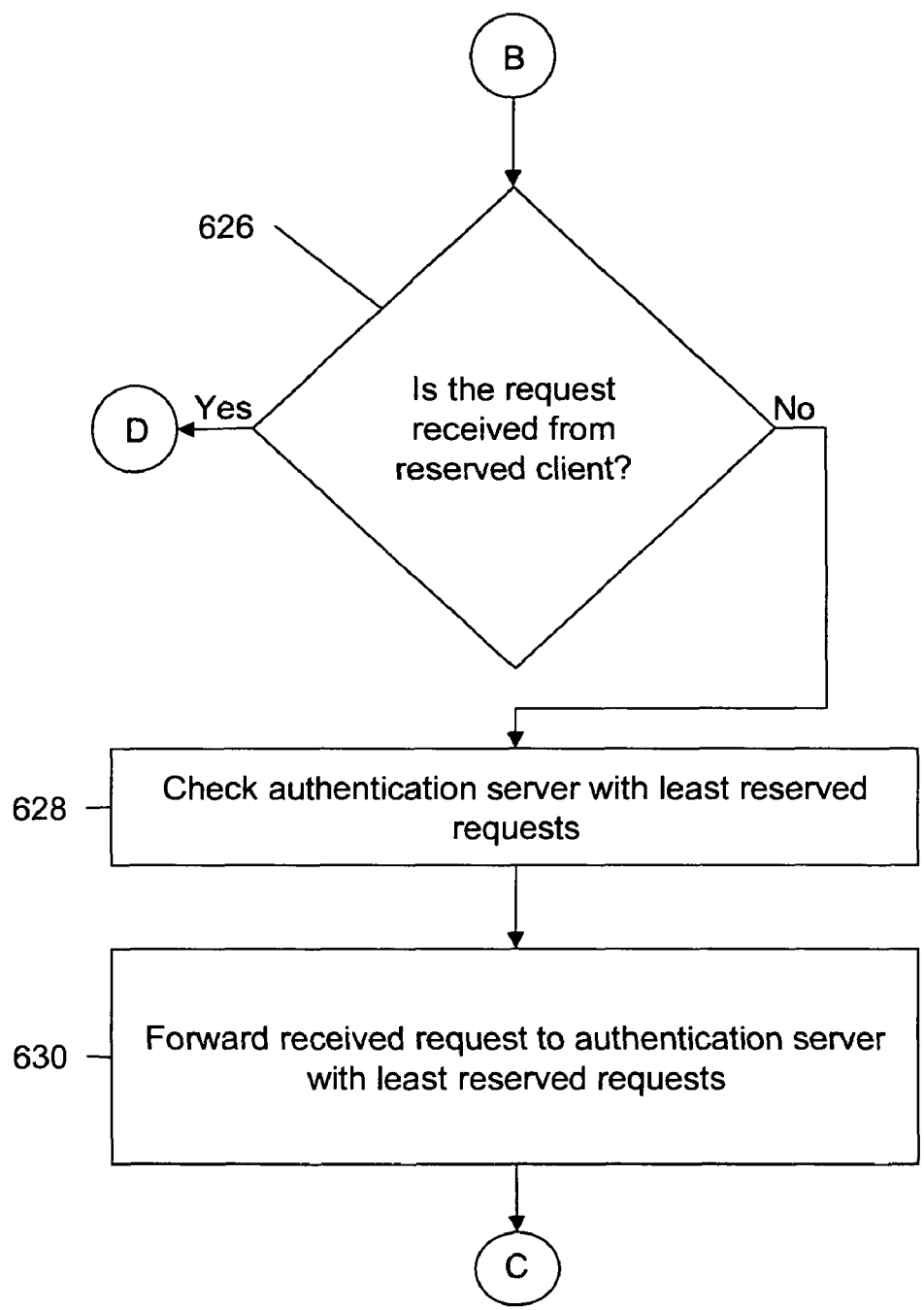

FIGS. 6a, 6b and 6c is a detailed flowchart illustrating a method for providing continuous service to authentication requests for clients 102 in network environment 100, in accordance with an exemplary embodiment of the invention. At step 602, one of clients 102 sends an authentication request to network access server 108. For example, client 102a sends the authentication request to network access server 108. At step 604, the authentication request is forwarded by network access server 108 to one of authentication servers 110. For example, the authentication request is forwarded by network access server 108 to authentication server 110a. At step 606, authentication server 110a serves the authentication request for client 102a. At step 608, authentication server 110a reserves the service of the authentication request for client 102a for a predefined time interval. The predefined time interval can be manually defined for authentication servers 110 as the time during which the authentication requests from any client will be served. At step 610, authentication server 110a updates the list of reserved authentication requests by adding the identification details of client 102a for which authentication request has been recently served. At step 612, authentication server 110a checks authentication servers 110, which are present in network environment 100.

At step 614, authentication server 110a updates another list with the number of authentication servers 110 and the reserved clients of each of authentication servers 110. At step 616, authentication server 110a forwards the list to network access server 108. For example, authentication server 110a forwards the list to network access servers in network environment 100. At Step 618, authentication server 110a checks the number of network access servers, which are present in network environment 100.

At step 620, authentication server 110a updates the second list with the number of network access servers. Step 620 is executed if there is more than one network access server 108 present in network environment 100. At step 622, the second list is forwarded to authentication servers 110. At step 624, network access server 108 checks if it receives more authentication requests from clients 102.

If network access server 108 receives more authentication requests from clients, step 626 is performed. For example, if network access server 108 receives more authentication requests from client 102b, step 626 is performed. At step 626, network access server 108 checks if client 102b is a reserved client of one of authentication servers 110 or not. If client 102b is a reserved client of one of authentication servers 110, step 604 is performed. For example, if client 102b is a reserved client for authentication server 110b, step 604 is performed. At step 604, authentication requests for the reserved client 102b will be forwarded to authentication server 110b.

At step 626, if it is determined that client 102b is not a reserved client for any of authentication servers 110, step 628 is performed. At step 628, network access server 108 checks which one of authentication servers 110 is currently serving the least number of reserved clients. At step 630, the authentication request for one of clients 102 is forwarded to the authentication server, which is currently serving the least number of reserved clients. For example, the authentication request for one of clients 102 is forwarded to authentication server 110c. This is followed by step 606, where authentication server 110c serves the authentication request of one of clients 102, thereby ensuring continuous service to the authentication requests for clients 102.

Embodiments of the present invention have the advantage of assuring quality of service to the clients even when networks face the problem of DOS attacks. The reservation of service mechanism implemented in the present invention allows a dynamic allocation of authentication servers to respond to the authentication requests for the clients, thereby authenticating their reserved clients.

Although the invention has been discussed with respect to specific embodiments thereof, these embodiments are merely illustrative, and not restrictive, of the invention. For example, a 'method for continuously serving authentication requests' can include any type of analysis, manual or automatic, to anticipate the needs of the method.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   receiving, on an intermediate system, an authentication request for authenticating a client, the client being one of a plurality of clients;
   identifying, using the intermediate system, a server for servicing the authentication request, the server being one of a plurality of servers, wherein the identifying comprises determining, based on information provided by the plurality of servers, whether at least one server from the plurality of servers is reserved for servicing requests from the client;
   based on identifying the server for servicing the authentication request, forwarding, using the intermediate system, the authentication request to the identified server;
   based on receiving the authentication request from the intermediate system, servicing the authentication request using the identified server;
   reserving a service for the client for a specified term of use using the identified server such that authentication requests from the client during the specified term of use are forwarded to the identified server;
   configuring the intermediate system to route subsequent authentication requests from the client to the identified server for the specified term of use, wherein the configuring comprises receiving, at the intermediate system, information indicating reservation of the service for the client; and terminating the reservation using the identified server upon expiration of the specified term of use.

2. The method of claim 1, wherein the reserving the service comprises serving authentication requests for a predefined time interval, the predefined time interval being a time interval during which the service for the authentication request is reserved for the client, the client being a reserved client, wherein the reserved client sends one or more authentication requests during the predefined time interval.

3. The method of claim 2 further comprising terminating the service for the authentication request that is reserved for the reserved client if the reserved client does not send the one or more authentication requests during the predefined time interval.

4. The method of claim 1 further comprising forwarding a list, the list comprising one or more reserved clients being served at each of a plurality of authentication servers, the one or more reserved clients being the clients for which the service for the authentication requests is reserved, the list being forwarded to a plurality of network access servers.

5. The method of claim 4, wherein the list further comprises identification associated with the plurality of authentication servers.

6. The method of claim 1, further comprising forwarding a list to a plurality of authentication servers, the list including information associated with a plurality of network access servers.

7. A method comprising:
identifying, using an intermediate system, a first authentication server to serve an authentication request for a first client, the first client being one of a plurality of clients, the first authentication server being one of a plurality of authentication servers in a network;
based on the identifying, forwarding, using the intermediate system, the authentication request to the first authentication server, the first authentication server reserving a first service for the first client for a specified term of use;
receiving a list from the first authentication server in response to forwarding the authentication request, the list comprising information relating to the plurality of authentication servers, the information including a number of services reserved by the plurality of authentication servers;
configuring the intermediate system to route subsequent communications from the first client to the first authentication server for the specified term of use, wherein the configuring comprises receiving, at the intermediate system, information indicating reservation of the first service for the first client by the first authentication server;
identifying one or more of the plurality of authentication servers to serve one or more authentication requests for remaining clients, the remaining clients being the plurality of clients excluding the first client, the identifying being performed based on information included in the list; and
terminating the first service upon conclusion of the specified term of use.

8. The method of claim 7, wherein the identifying one or more of the plurality of authentication servers comprises:
determining, based on information included in the list, whether the first authentication server is capable of reserving a second service; and
based on determining that the first authentication server is capable of reserving a second service, forwarding the one or more authentication requests for the remaining clients to the first authentication server.

9. A system comprising:
one or more processors;
a transceiver module including instructions encoded in a non-transitory storage medium for execution by the one or more processors and configured to cause the one or more processors to perform operations including:
receiving, on an intermediate system, an authentication request for authenticating a client, the client being one of a plurality of clients; and
a reservation module including instructions encoded in a non-transitory storage medium for execution by the one or more processors and configured to cause the one or more processors to perform operations including:
identifying, using the intermediate system, a server for servicing the authentication request, the server being one of a plurality of servers, wherein the identifying comprises determining, based on information provided by the plurality of servers, whether at least one server from the plurality of servers is reserved for servicing requests from the client;
based on identifying the server for servicing the authentication request, forwarding, using the intermediate system, the authentication request to the identified server;
based on receiving the authentication request from the intermediate system, servicing the authentication request using the identified server;
reserving a service for the client for a specified term of use using the identified server such that authentication requests from the client during the specified term of use are forwarded to the identified server;
configuring the intermediate system to route subsequent authentication requests from the client to the identified server for the specified term of use, wherein the configuring comprises receiving at the intermediate system information indicating reservation of the service for the client; and
terminating the reservation using the identified server upon expiration of the specified term of use.

10. The system of claim 9, wherein the reservation module comprises:
a serving module for servicing authentication requests from the client for the specified term of use; and
a processing module for forwarding one or more lists, the lists being forwarded to a plurality of network access servers and to a plurality of authentication servers.

11. The system of claim 10, wherein the processing module comprises:
a storage module including a non-transitory computer-readable medium for storing the one or more lists;
a checking module for checking one or more authentication servers and one or more network access servers in a network;
an updating module for updating stored lists; and
a transmitting module for transmitting the updated lists.

12. A system comprising:
one or more processors;
a transceiver module including instructions encoded in a non-transitory storage medium for execution by the one or more processors and configured to cause the one or more processors to perform operations including:
identifying, using an intermediate system, a first authentication server to serve an authentication request for a first client, the first client being one of a plurality of clients, the first authentication server being one of a plurality of authentication servers in a network;

based on the identifying, forwarding, using the intermediate system, the authentication request to the first authentication server, the first authentication server reserving a first service for the first client for a specified term of use;

receiving a list from the first authentication server in response to forwarding the authentication request, the list comprising information relating to the plurality of authentication servers, the information including a number of services reserved by the plurality of authentication servers;

a storage module including a non-transitory computer-readable medium for storing the received list; and a decision module including instructions encoded in a non-transitory storage medium for execution by the one or more processors and configured to cause the one or more processors to perform operations including:

deciding, based on information included in the list, which client is a reserved client of an authentication server, the decision module also deciding which authentication server is serving a least number of authentication requests;

configuring the intermediate system to route subsequent communications from the first client to the first authentication server for the specified term of use, wherein the configuring comprises receiving at the intermediate system information indicating reservation of the first service for the first client by the first authentication server;

identifying one or more of the plurality of authentication servers to serve one or more authentication requests for remaining clients, the remaining clients being the plurality of clients excluding the first client, the identifying being performed based on information included in the list; and terminating the first service upon conclusion of the specified term of use.

13. A non-transitory machine-readable medium including one or more instructions executable by a processor and when executed by the processor cause the processor to perform actions including:

receiving, on an intermediate system, an authentication request for authenticating a client, the client being one of a plurality of clients;

identifying, using the intermediate system, a server for servicing the authentication request, the server being one of a plurality of servers, wherein the identifying comprises determining, based on information provided by the plurality of servers, whether at least one server from the plurality of servers is reserved for servicing requests from the client;

based on identifying the server for servicing the authentication request, forwarding, using the intermediate system, the authentication request to the identified server;

based on receiving the authentication request from the intermediate system, servicing the authentication request using the identified server;

reserving a service for the client for a specified term of use using the identified server such that authentication requests from the client during the specified term of use are forwarded to the identified server;

configuring the intermediate system to route subsequent authentication requests from the client to the identified server for the specified term of use, wherein the configuring comprises receiving, at the intermediate system, information indicating reservation of the service for the client; and terminating the reservation using the identified server upon expiration of the specified term of use.

14. An apparatus comprising:

a processor for executing instructions; and a non-transitory machine readable medium including one or more instructions executable by the processor, the one or more instructions when executed by the processor cause the processor to perform operations including:

receiving, on an intermediate system, an authentication request for authenticating a client, the client being one of a plurality of clients;

identifying, using the intermediate system, a server for servicing the authentication request, the server being one of a plurality of servers, wherein the identifying comprises determining, based on information provided by the plurality of servers, whether at least one server from the plurality of servers is reserved for servicing requests from the client;

based on identifying the server for servicing the authentication request, forwarding, using the intermediate system, the authentication request to the identified server;

based on receiving the authentication request from the intermediate system, servicing the authentication request using the identified server;

reserving a service for the client for a specified term of use using the identified server such that authentication requests from the client during the specified term of use are forwarded to the identified server;

configuring the intermediate system to route subsequent authentication requests from the client to the identified server for the specified term of use, wherein the configuring comprises receiving at the intermediate system information indicating reservation of the service for the client; and terminating the reservation using the identified server upon expiration of the specified term of use.

15. The method of claim 8, comprising:

based on determining that the first authentication server is not capable of reserving a second service, forwarding the one or more authentication requests for the remaining clients to one or more of a plurality of remaining authentication servers, the plurality of remaining authentication servers being the plurality of authentication servers excluding the first authentication server, at least one of the plurality of remaining authentication servers serving a number of authentication requests that is lower than a maximum number of authentication requests that the at least one authentication server is capable of serving.

* * * * *